(12) United States Patent
Rofougaran

(10) Patent No.: US 8,311,506 B2
(45) Date of Patent: Nov. 13, 2012

(54) RFID RECEIVER FRONT END WITH PHASE CANCELLATION AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 932 days.

(21) Appl. No.: 12/393,443

(22) Filed: Feb. 26, 2009

(65) Prior Publication Data

US 2010/0214063 A1 Aug. 26, 2010

(51) Int. Cl.
*H04B 1/10* (2006.01)
(52) U.S. Cl. ............ 455/296; 455/63.1; 455/67.13
(58) Field of Classification Search ......... 455/63.1, 455/67.11, 67.13, 278.1, 296
See application file for complete search history.

(56) References Cited

U.S. PATENT DOCUMENTS

2008/0318680 A1* 12/2008 Rofougaran et al. ........... 463/39
2008/0318682 A1* 12/2008 Rofougaran et al. ........... 463/39

* cited by examiner

*Primary Examiner* — Raymond Dean
(74) *Attorney, Agent, or Firm* — Garlick & Markison; Bruce E. Stuckman

(57) ABSTRACT

An radio frequency identification (RFID) receiver front end includes an antenna module coupled to generate a plurality of millimeter wave RFID signals from a remote RFID device. A plurality of a phase adjusters generate a plurality of phase adjusted signals from the plurality of millimeter wave RFID signals, based on a plurality of control signals. A combining module combines the plurality of phase adjusted signals to generate a received signal. A signal strength module generates a signal strength of the received signal. A control module generates the plurality of control signals to reduce the signal strength of the received signal.

20 Claims, 14 Drawing Sheets

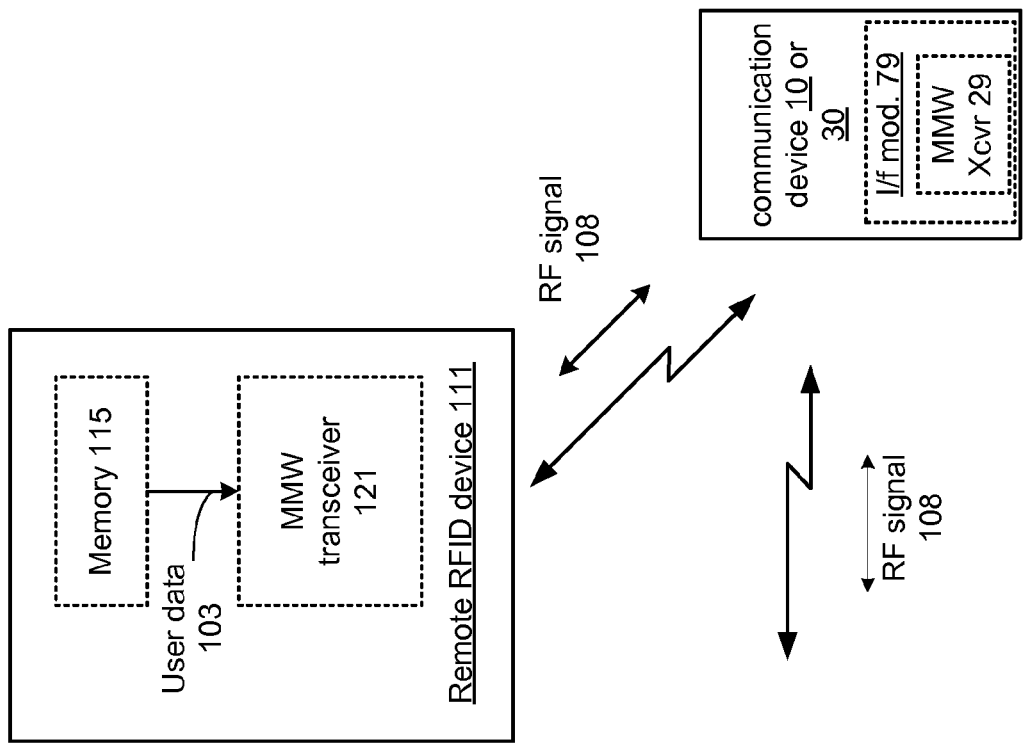
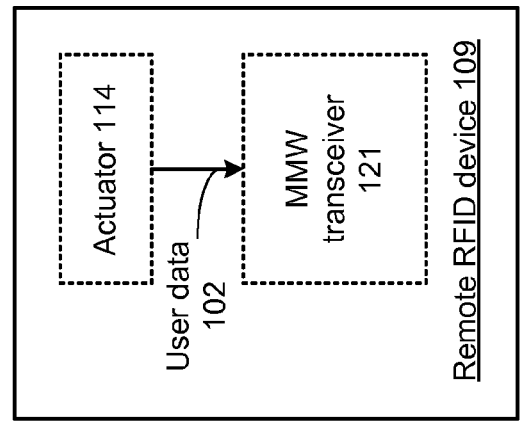
FIG. 4

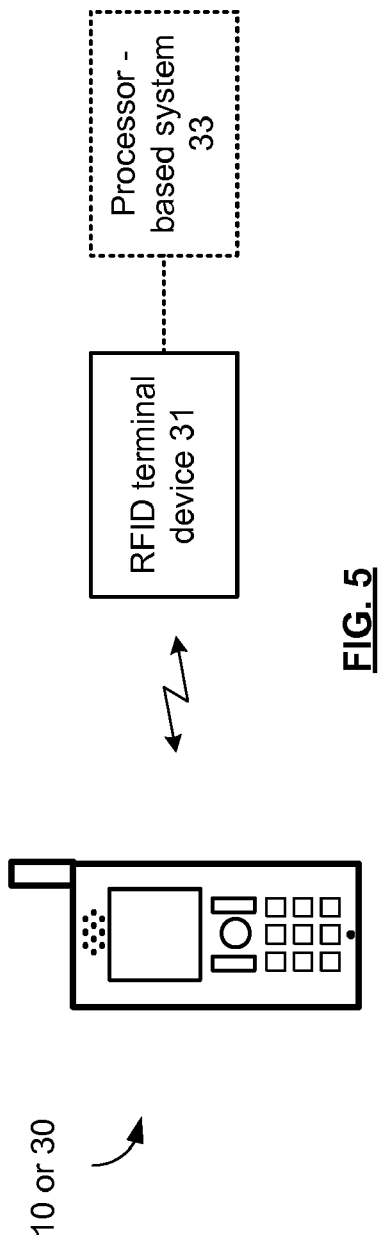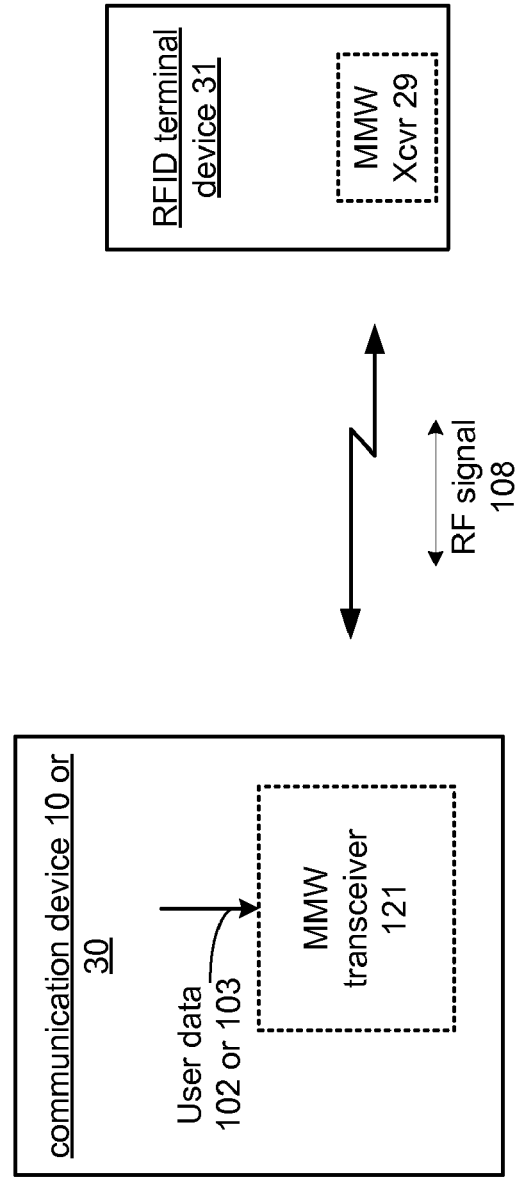

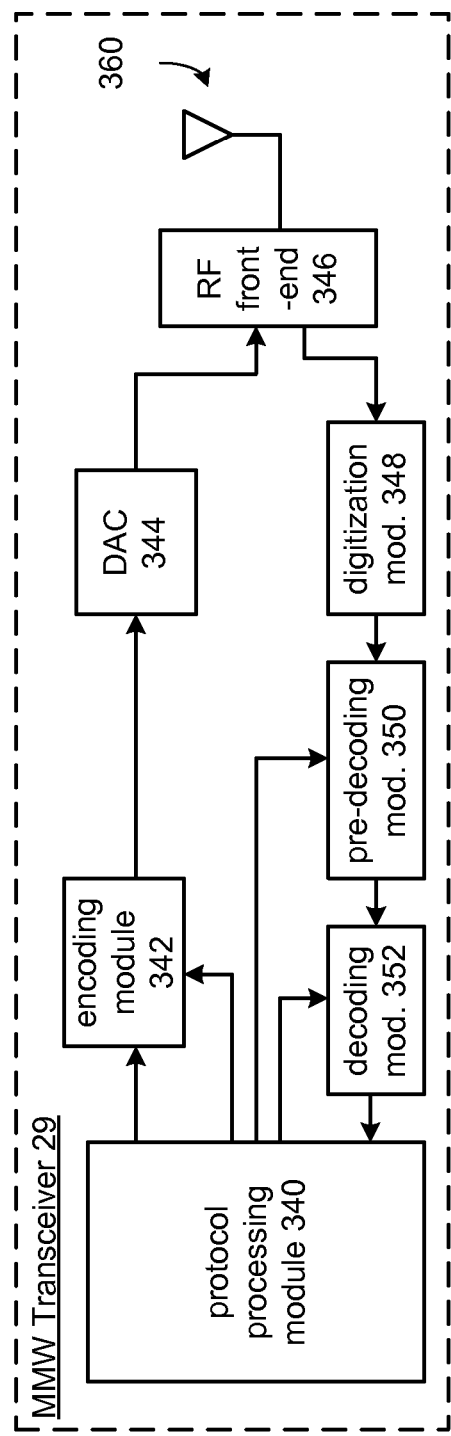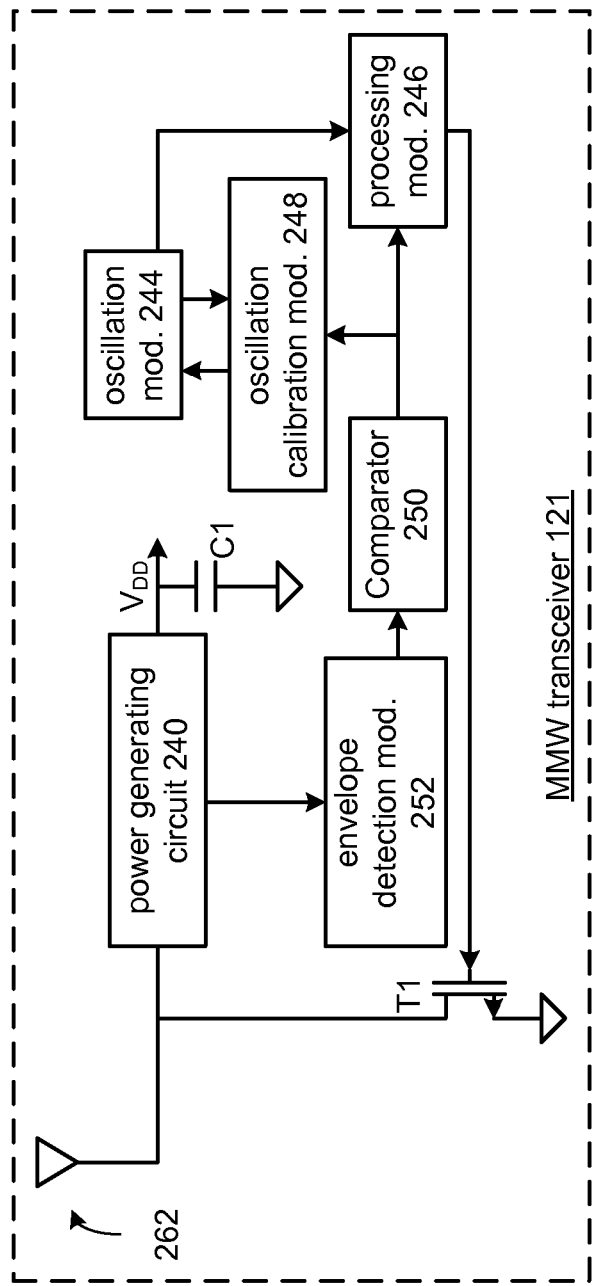
FIG. 11 top view side view bottom view

US 8,311,506 B2

RFID RECEIVER FRONT END WITH PHASE CANCELLATION AND METHODS FOR USE THEREWITH

CROSS REFERENCE TO RELATED APPLICATIONS

Not Applicable

BACKGROUND OF THE INVENTION

1. Technical Field of the Invention

This invention relates generally to mobile communication devices and more particularly communication devices that include RFID functionality.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, millimeter wave transceiver, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Wireless communication devices can be coupled to various peripheral devices on a wired basis. In addition, a Bluetooth communications link allows peripheral devices such as a headset to be coupled to a communications device on a wireless basis.

The advantages of the present invention will be apparent to one skilled in the art when presented with the disclosure herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 4 is a block diagram representation of a communication device and peripherals in accordance with an embodiment of the present invention;

FIG. 5 is a pictorial diagram representation of a communication device and RFID terminal device in accordance with an embodiment of the present invention;

FIG. 6 is a block diagram representation of a communication device and RFID terminal device in accordance with an embodiment of the present invention;

FIG. 11 is a schematic block diagram of an embodiment of millimeter wave transceivers 29 and 121 in accordance with an embodiment of the present invention;

DETAILED DESCRIPTION OF THE INVENTION

Figure 1:
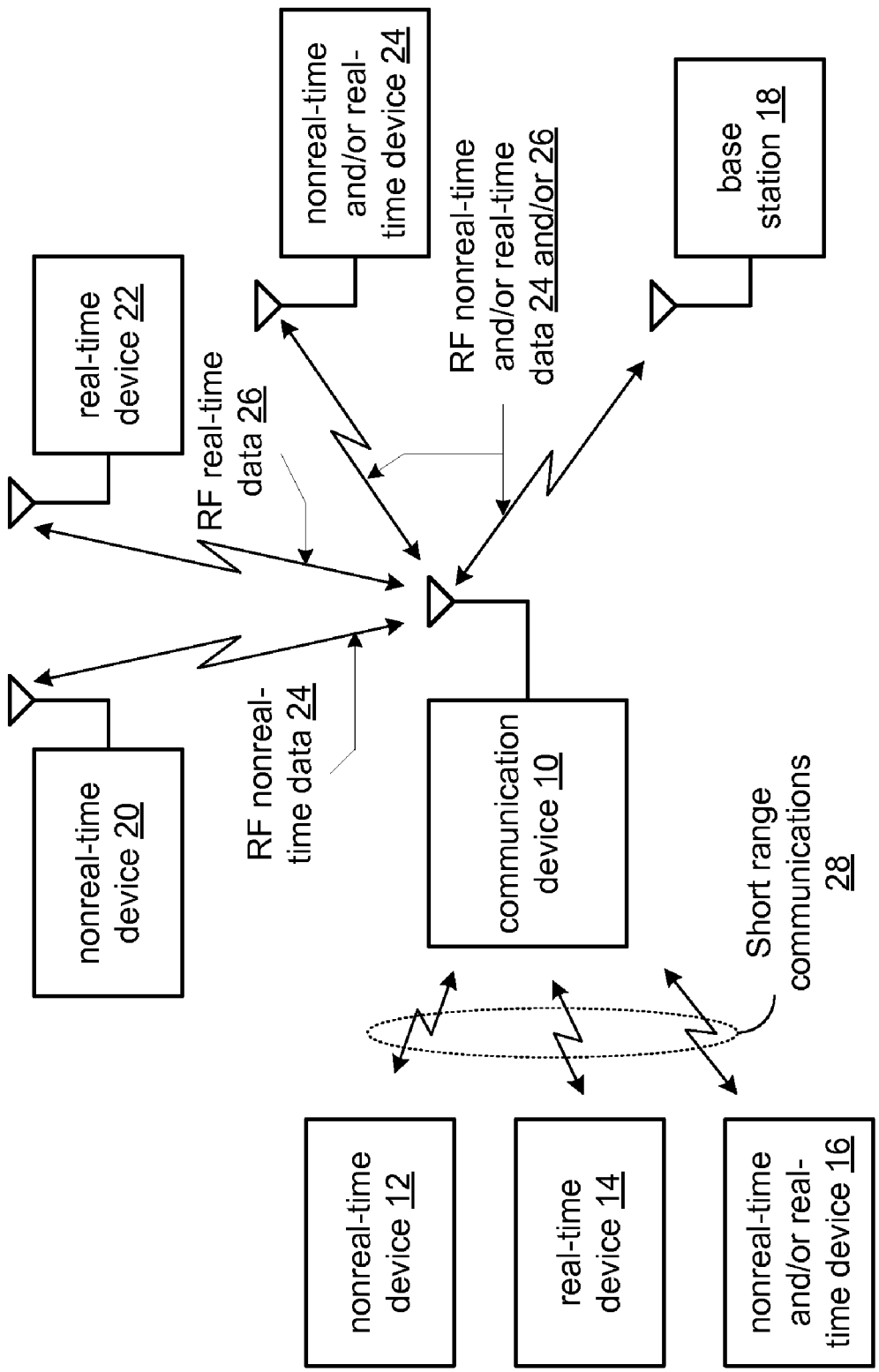
FIG. 1 is a schematic block diagram of an embodiment of a communication system in accordance with the present invention.

FIG. 1 is a schematic block diagram of an embodiment of a communication system in accordance with the present invention. In particular, a communication system is shown that includes a communication device 10 that communicates real-time data 24 and/or non-real-time data 26 wirelessly with one or more other devices such as base station 18, non-real-time device 20, real-time device 22, and non-real-time and/or real-time device 24. In addition, communication device 10 can also communicate via short range wireless communications 28, such as a millimeter wave communications with non-real-time device 12, real-time device 14, non-real-time and/or real-time device 16.

The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, communications device, personal computer, laptop computer, or other device that performs one or more functions that include communication of voice and/or data via short range wireless communications 28 and/or the wireless communication path. In an embodiment of the present invention, the real-time and non-real-time devices 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications. Real-time and non-real-time devices 12, 14 and 16 can be: user interface devices such as a mouse or other pointing device, a touch pad, keyboard, keypad, microphone, earphones, headsets; other peripheral devices such as a memory, RFID device; and/or other devices that can be coupled to communications device 10 via short range communications 28.

The communication device 10 can includes one or more applications that operate based on user data, such as user data from a peripheral device, user interface device or memory in communication with the communication device 10. Examples of these application include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In addition or in the alternative, real-time and non-real-time devices 12, 14 and 16 can include a RFID terminal and the communication device 10 can itself operate as a RFID tag. In operation, the communication device 10 can run an application that includes an RFID function such as secure access, user authentication, payment system, etc. In this fashion, the communication device 10 can operate as a identification card, key card, credit or debit card.

In an embodiment of the present invention, the communication device 10 includes an integrated circuit, such as a combined voice, data and RF integrated circuit that includes one or more features or functions of the present invention. Such circuits shall be described in greater detail in association with FIGS. 4-18 that follow.

Figure 2:
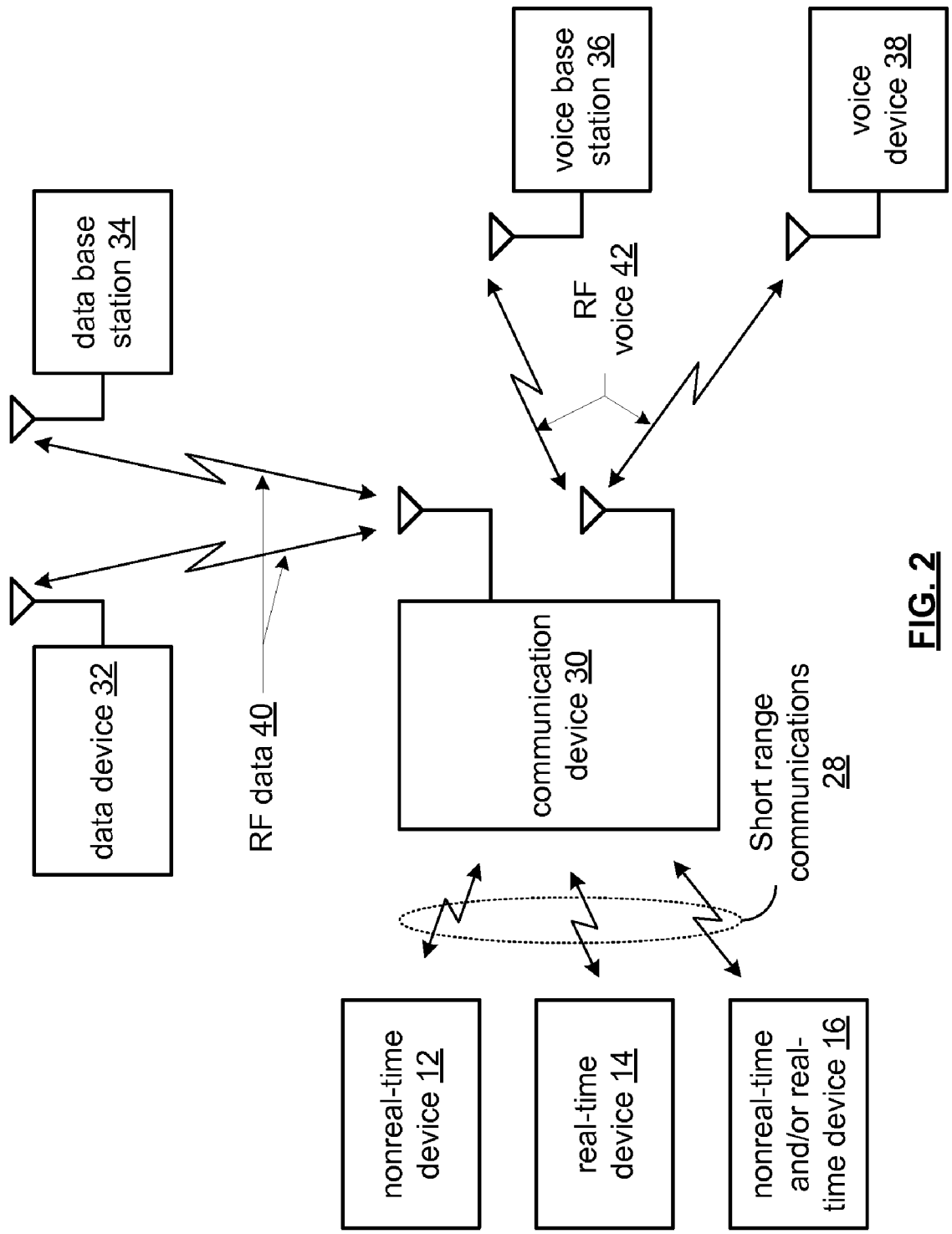
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

In an embodiment of the present invention, the communication device 30 includes a circuit, such as a combined voice, data and RF integrated circuit that includes one or more features or functions of the present invention. Such circuits shall be described in greater detail in association with FIGS. 4-18 that follow.

Figure 3:
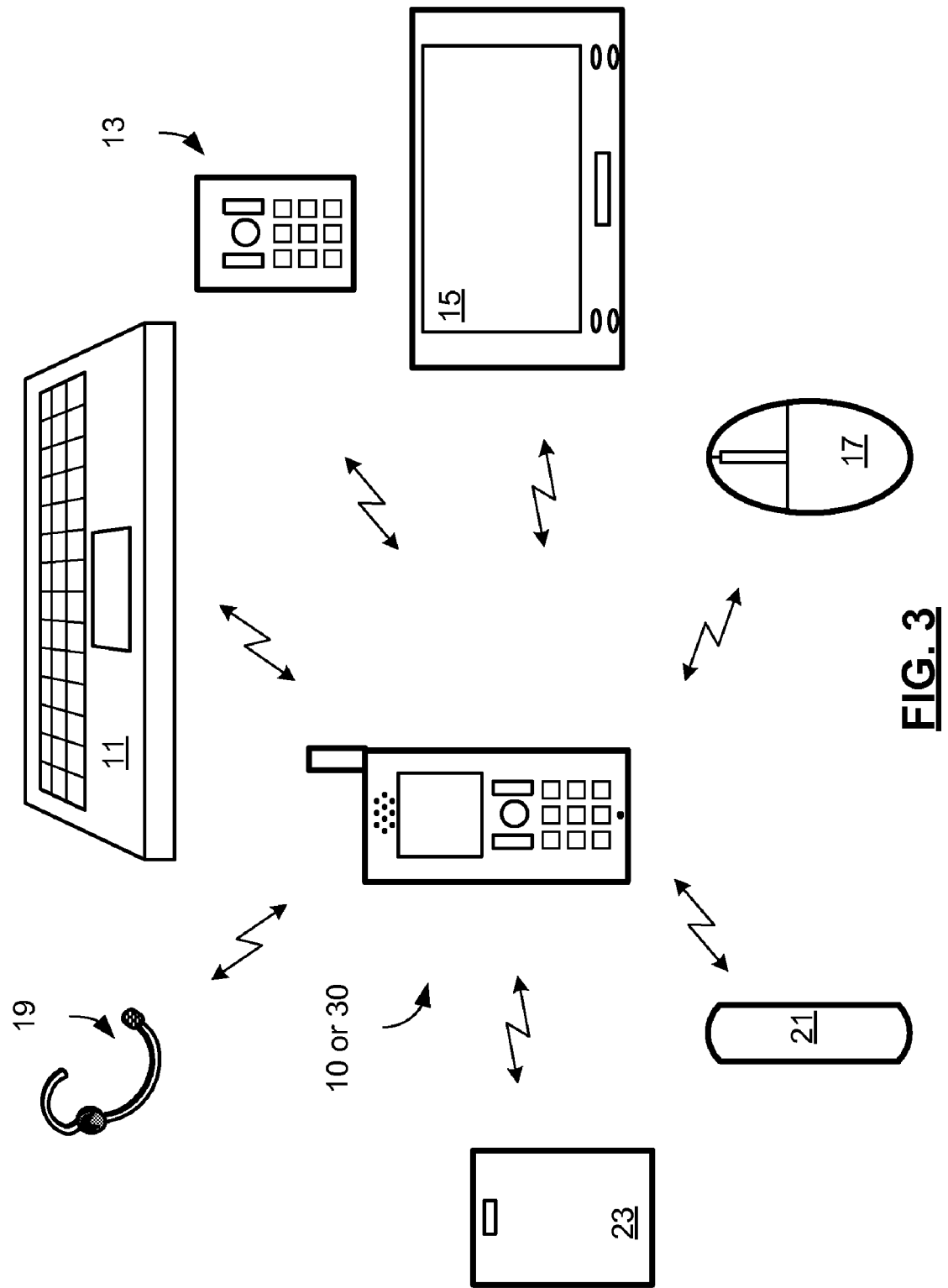
FIG. 3 is a pictorial diagram representation of a communication device and peripherals in accordance with an embodiment of the present invention.

FIG. 3 is a pictorial diagram representation of a communication device and peripheral in accordance with an embodiment of the present invention. In particular, communications device 10 or 30 is shown that is coupled via short range communications, such as short range communications 28, to communicate with real-time or non-real-time devices such as keyboard 11, keypad 13, touchpad 15, pointing device 17, headset 19, flash memory device 21 and RFID card 23. In accordance with the present invention, communications device 10 or 30 transmits an RF signal that powers a remote RFID device, such as keyboard 11, keypad 13, touchpad 15, pointing device 17, headset 19, flash memory device 21 or RFID card 23. Backscattering of this RF signal by the peripheral device conveys user data back to the communications device 10 or 30. Further details regarding the interface between communications device 10 or 30 and such remote RFID devices will be described in conjunction with FIG. 4.

FIG. 4 is a block diagram representation of a communication device and peripherals in accordance with an embodiment of the present invention. In particular, a communication system is shown that includes communications device 10 or 30 and one or more remote RFID devices 109 and 111. In this mode of operation, the communication device 10 or 30 operates as an RFID terminal to communicate with, and to optionally power, one or more remote RFID devices. In this example, remote RFID device 109 is a user interface device, such as keyboard 11, keypad 13, touchpad 15, pointing device 17, headset 19. Remote RFID device 111 is another peripheral device such as flash memory device 21, RFID card 23 or other device Remote RFID device 109 includes an actuator 114 for generating user data, such as user data 102 in response to the actions of a user. Actuator 114 can include a button, joy stick, wheel, keypad, touch screen, keyboard, motion sensor (such as an on-chip gyrator or accelerometer or other position or motion sensing device) a photo emitter and photo sensor or other actuator along with other driver circuitry for generating user data 102 based on the motion of the remote RFID device 109 or other actions of the user.

Millimeter wave transceiver 121 is coupled to receive an RF signal 108 initiated by communications device 10 or 30, such as a 60 GHz RF signal or other millimeter wave RF signal. In a similar fashion to a passive RFID tag, millimeter wave transceiver 121 converts energy from the RF signal 108 into a power signal for powering the millimeter wave transceiver 121 or all or some portion of the remote RFID device 109. By the remote RFID device 109 deriving power, in while or in part, based on RF signal 108, remote RFID device 109 can optionally be portable, small and light. Millimeter wave transceiver 121 conveys the user data 102 back to the communications device 10 or 30 by backscattering the RF signal 108 based on user data 102.

Communications device 10 or 30 includes an interface module 79 that has a millimeter wave transceiver 29 for coupling to the remote RFID device 109. In particular, millimeter wave transceiver 29 transmits RF signal 108 for powering the remote RFID device 109. In operation, millimeter wave transceiver 29 also demodulates the backscattering of the RF signal 108 to recover the user data 102. Interface module 79 can further include an optional protocol translation module not shown, for translating backscattered data received from the remote RFID device 109 from a protocol used in the short range communications 28 to a host protocol. In a further embodiment of the present invention, the protocol stack used in short range communications 28 includes the host protocol.

In a similar fashion, communication device 10 or 30 can communicate with remote RFID device 111 via its own millimeter wave transceiver 121 to power the remote RFID device 111 and receive user data 103 stored in memory 115. In addition, RF signal 108 can be modulated by communication device 10 or 30 to store user data originated by communication device 10 or 30 in memory 115 of the remote RFID device 111.

FIG. 5 is a pictorial diagram representation of a communication device and RFID terminal device in accordance with an embodiment of the present invention. In this mode of operation, the communication device 10 or 30 operates as an RFID tag to communicate with, and to optionally receive power from a remote RFID device such as RFID terminal device 31. In accordance with the present invention, communications device 10 or 30 receives an RF signal from the RFID terminal device 31. Backscattering of this RF signal by the communication device 10 or 30 conveys user data back to the RFID terminal device 31. Further details regarding the interface between communications device 10 or 30 and RFID terminal device 31 will be described in conjunction with FIG. 6.

In an embodiment of the present invention, the communication device 10 or 30 can operate itself as a user interface device. In this fashion, the keypad, touch screen, of other user interfaces functions of communication device 10 or 30 can generate user data, such as user data 102 that is communicated with RFID terminal device 31. For example, RFID terminal 31 can be coupled to or incorporated in a processor-based system 33, such as a personal computer, game console, cash register, home entertainment system or other processor-based system that operated based on user input. Communication device 10 or 30 can operate as a user interface device to generate user data 102 based on the action of the user to control or otherwise provide input in the form of user data 102 to the processor-based system 33.

In an embodiment of the present invention, the communication device 10 or 30 can operate to store user data 103 that is communicated with RFID terminal device 31. For example, communication device can operate as a key card, debit card or secure identification card and provide user data 103 as part of a secure transaction to open a door, make a purchase, or access an application of processor-based system 33. In addition, user data 103 can be stored in communication device 10 or 30 to support a host of other applications used in conjunction with processor-based systems such as processor based-system 33.

FIG. 6 is a block diagram representation of a communication device and RFID terminal device in accordance with an embodiment of the present invention. In accordance with this embodiment of the present invention, MMW transceiver 29 is included in RFID terminal 31 and millimeter wave transceiver 121 is included in communication device 10 or 30.

Millimeter wave transceiver 121 is coupled to receive an RF signal 108 initiated by RFID terminal 31, such as a 60 GHz RF signal or other millimeter wave RF signal. In a similar fashion to a passive RFID tag, millimeter wave transceiver 121 optionally converts energy from the RF signal 108 into a power signal for powering the millimeter wave transceiver 121 some portion of the communication device 10 or 30. By the communication device 10 or 30 deriving power, in whole or in part, based on RF signal 108, can optionally perform some functions such as key card access, credit or debit card transactions, user authentication, or operate as a remote control device or other user interface device without requiring battery power from the communication device 10 or 30. In the alternative, communication device 10 or 30 can be independently powered via a battery or other power source. As described in conjunction with FIG. 4, millimeter wave transceiver 121 conveys the user data 102 or 103 back to the millimeter wave transceiver 29 by backscattering the RF signal 108 based on user data 102 or 103.

Figure 7:
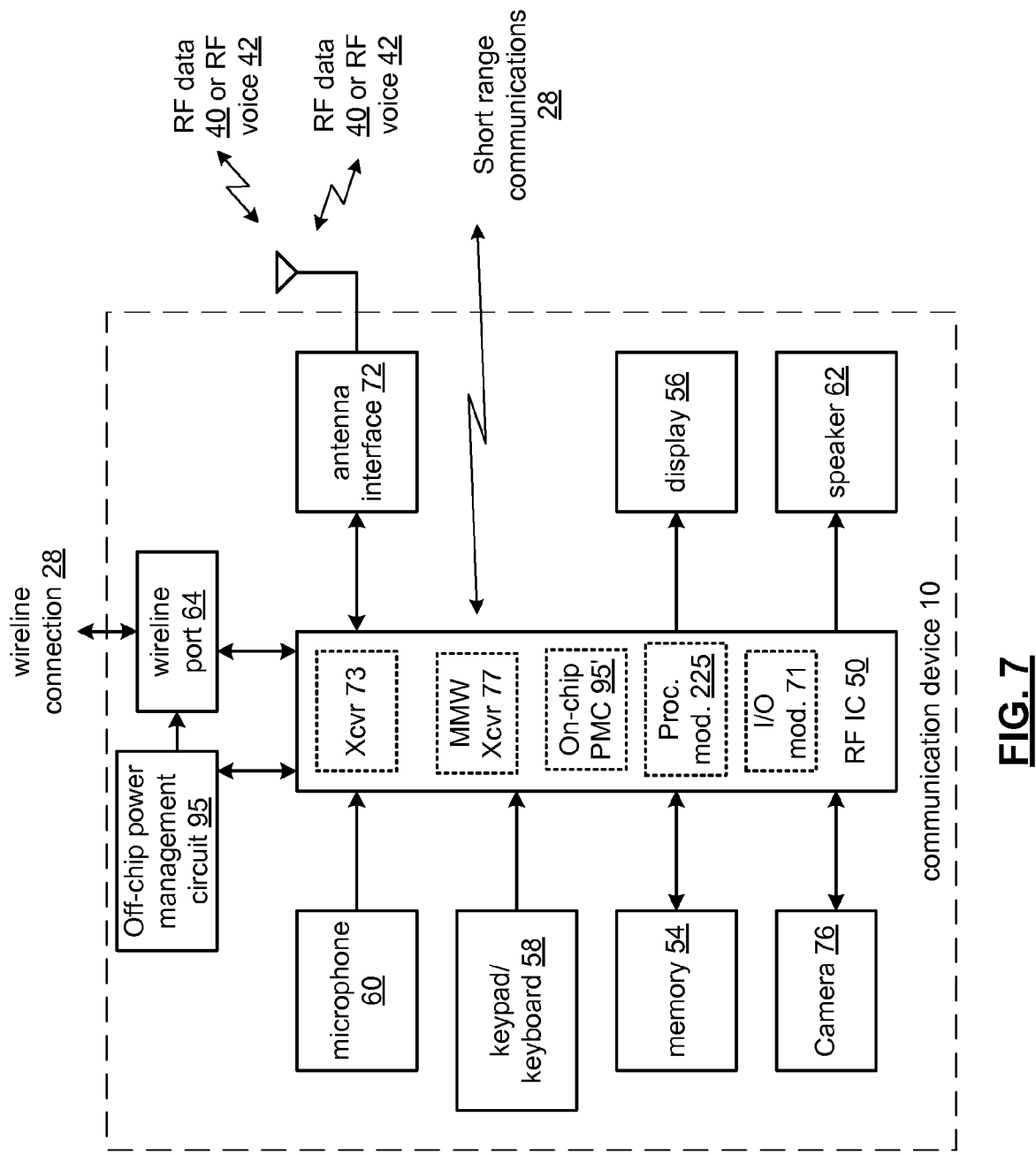
FIG. 7 is a schematic block diagram of an embodiment of an integrated circuit in accordance with the present invention.

FIG. 7 is a schematic block diagram of an embodiment of an integrated circuit in accordance with the present invention. In particular, an RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, RF IC 50 includes a transceiver 73 with RF and baseband modules for formatting and modulating data into RF real-time data 26 and non-real-time data 24 and transmitting this data via an antenna interface 72 and an antenna. RF IC 50 includes a millimeter wave transceiver 77, such as millimeter wave transceiver 29 for providing power to and communicating with a remote RFID device such as remote RFID devices 109 and 111. Further millimeter wave transceiver 77 can be implemented as millimeter wave transceiver 121 for communication with a remote RFID device such as RFID terminal device 31. Millimeter wave transceiver includes an on-chip coil, such as a near field coil or other on-chip antenna structure for engaging in short range communications 28 via an millimeter wave RF signal such as RF signal 108.

RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Off-chip power management circuit 95 can operate from one or more batteries, line power, power optionally received via millimeter wave transceiver 121 and/or from other power sources, not shown. In particular, off-chip power management module can selectively supply power supply signals of different voltages, currents or current limits or with adjustable voltages, currents or current limits in response to power mode signals received from the RF IC 50. RF IC 50 optionally includes an on-chip power management circuit 95' for replacing the off-chip power management circuit 95.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the processing module 225 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 50 executes operational instructions that implement one or more of the applications (real-time or non-real-time) attributed to communication devices 10 and 30 as discussed in conjunction with FIGS. 1-6.

Figure 8:
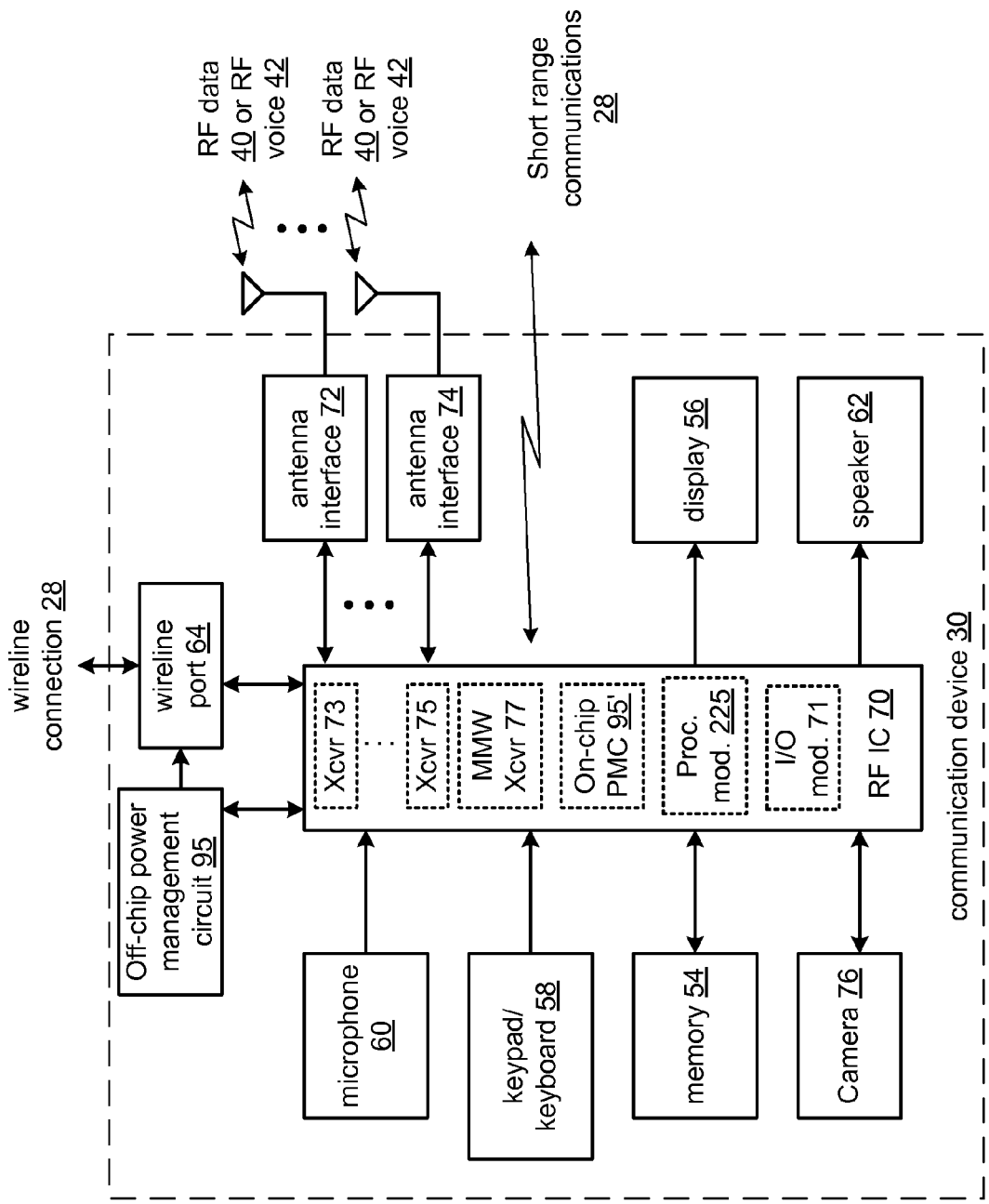
FIG. 8 is a schematic block diagram of another embodiment of an integrated circuit in accordance with the present invention.

FIG. 8 is a schematic block diagram of another embodiment of an integrated circuit in accordance with the present invention. In particular, FIG. 8 presents a communication device 30 that includes many common elements of FIG. 7 that are referred to by common reference numerals. RF IC 70 is similar to RF IC 50 and is capable of any of the applications, functions and features attributed to RF IC 50 as discussed in conjunction with FIG. 7. However, RF IC 70 includes two or more separate wireless transceivers 73 and 75 for communicating, contemporaneously, via two or more wireless communication protocols via RF data 40 and RF voice signals 42.

In operation, the RF IC 70 executes operational instructions that implement one or more of the applications (real-time or non-real-time) attributed to communication device 10 or 30 as discussed in conjunction with FIGS. 1-6.

Figure 9:
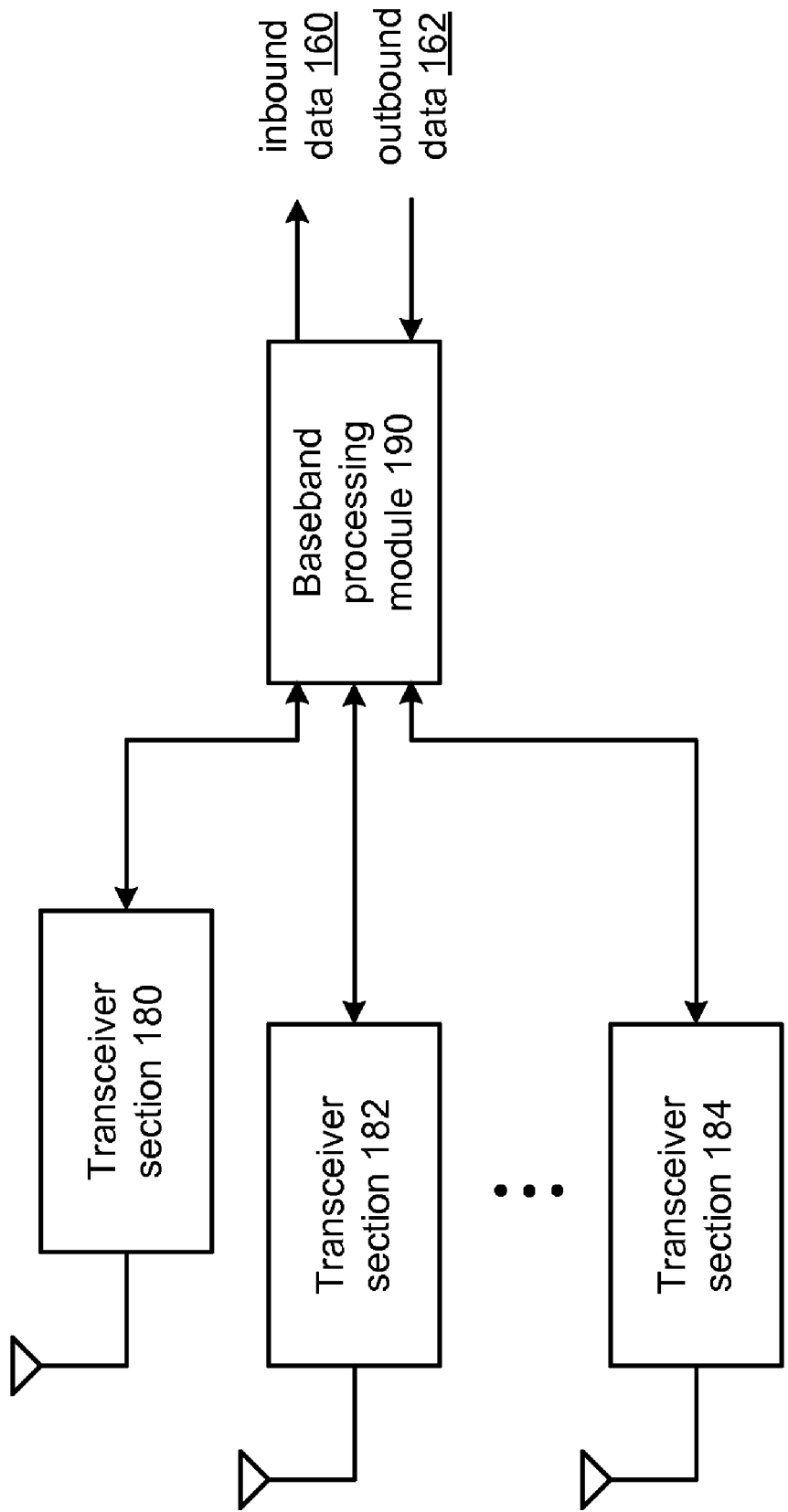
FIG. 9 is a schematic block diagram of an embodiment of a baseband processing module supporting a plurality of transceiver sections in accordance with the present invention.

FIG. 9 is a schematic block diagram of an embodiment of a baseband processing module supporting a plurality of transceiver sections in accordance with the present invention. In an embodiment of the present invention, the transceiver sections 180, 182, 184 can include a radio frequency identification (RFID) transceiver section, coupled to an on-chip coil, that communicates RFID data with a remote RFID device via the on-chip coil, a pico area network transceiver section that communicates pico area network data, such as Bluetooth data, with a remote pico area network device, a wireless local area network (WLAN) transceiver section that communicates WLAN data, such as data formatted in accordance with an 802.11 protocol with a remote WLAN device, and a wireless telephone transceiver section that communicates wireless telephony data, such as GSM data, GPRS data, EDGE data, UMTS data, etc. with a remote wireless telephony device. The baseband processing module 190 performs baseband processing to produce inbound data 160 from an inbound symbol stream and to process outbound data 162 to produce an outbound symbol stream, wherein the inbound data and/or the outbound data include RFID data, pico area network data, WLAN data and wireless telephony data.

In an embodiment of the present invention, the baseband processing module 190 includes a parallel processor or other processing configuration that allows the baseband processing module to contemporaneously operate two or more processing applications that allow the baseband processing module to produce RFID data, pico area network data, WLAN data and/or wireless telephony data contemporaneously. In the alternative, the baseband processing module 190 operates on data from one transceiver sections 180, 182 or 184 one at a time to produces RFID data, pico area network data, WLAN data and wireless telephony data sequentially. For instance, the baseband processing module can process inbound data 160 and outbound data 162 for the RFID transceiver section in a RFID mode, can process inbound data 160 and outbound data 162 for the pico area network transceiver section in a pico area network mode, can process inbound data 160 and outbound data 162 for the WLAN transceiver section in a WLAN mode, and can process inbound data 160 and outbound data 162 for the wireless telephony transceiver section in a wireless telephony mode.

The baseband processing module 190 can include a processing device such as a shared processing device, individual processing device, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 10:
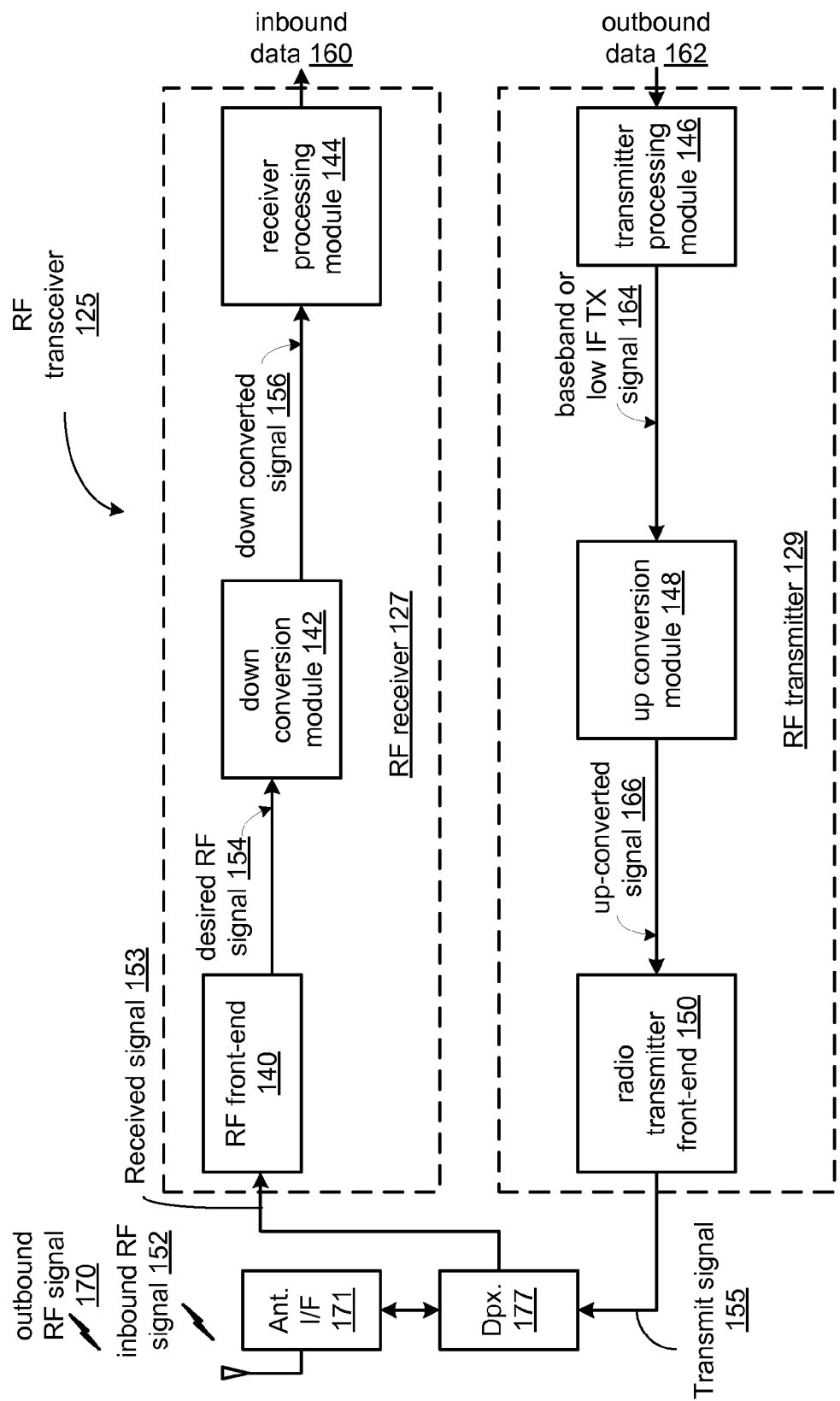
FIG. 10 is a schematic block diagram of an embodiment of an RF transceiver in accordance with the present invention.

FIG. 10 is a schematic block diagram of an RF transceiver 125, such as transceiver 73 or 75, which may be incorporated in communication devices 10 and/or 30. The RF transceiver 125 includes an RF transmitter 129, an RF receiver 127 that operate in accordance with a wireless local area network protocol, a pico area network protocol, a wireless telephony protocol, a wireless data protocol, or other protocol. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound RF signal 152 to produce received signal 153. While a single antenna is represented, the receiver and transmitter may each employ separate antennas or share a multiple antenna structure that includes two or more antennas. In another embodiment, the receiver and transmitter may share a multiple input multiple output (MIMO) antenna structure that includes a plurality of antennas. Each antenna may be fixed, programmable, an antenna array or other antenna configuration. Accordingly, the antenna structure of the wireless transceiver may depend on the particular standard(s) to which the wireless transceiver is compliant and the applications thereof.

In operation, the transmitter receives outbound data 162 from processor 225 or other or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164 that include an outbound symbol stream. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass filtration of the inbound RF signal 152.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 can include, but is not limited to, digital intermediate frequency to baseband conversion, demodulation, demapping, depuncturing, decoding, and/or descrambling.

Note that the receiver processing module 144 and the transmitter processing module 146 can be implemented using baseband processing module 190 that supports multiple transceiver sections.

FIG. 11 is a schematic block diagram of an embodiment of millimeter wave transceivers 29 and 121 in accordance with an embodiment of the present invention. As shown, millimeter wave transceiver 29 includes a protocol processing module 340, an encoding module 342, an RF front-end 346, a digitization module 348, a predecoding module 350 and a decoding module 352, all of which together form components of the millimeter wave transceiver 29. Millimeter wave transceiver 29 optionally includes a digital-to-analog converter (DAC) 344.

The protocol processing module 340 is operably coupled to prepare data for encoding in accordance with a particular RFID standardized protocol. In an exemplary embodiment, the protocol processing module 340 is programmed with multiple RFID standardized protocols or other protocols to enable the millimeter wave transceiver 29 to communicate with any user interface device, regardless of the particular protocol associated with the device. In this embodiment, the protocol processing module 340 operates to program filters and other components of the encoding module 342, decoding module 352, pre-decoding module 350 and RF front end 346 in accordance with the particular RFID standardized protocol of the user interface devices currently communicating with the millimeter wave transceiver 29. However, if communication device 10 or 30 operates in accordance with a single protocol, this flexibility can be omitted. One or more of the protocol processing module 340, encoding module 342, digitization module 348, decoding module 352, and pre-decoding module 350 can be implemented via a shared baseband processing module 190.

In operation, once the particular protocol has been selected for communication by communication device 10 or 30, the protocol processing module 340 generates and provides digital data to be communicated to the millimeter wave transceiver 121 to the encoding module 342 for encoding in accordance with the selected protocol. This digital data can include commands to power up the millimeter wave transceiver 121, to read user data or other commands or data used by the remote RFID devices 109 or 111 or communication device 10 or 30 in association with its operation. By way of example, but not limitation, the RFID protocols may include one or more line encoding schemes, such as Manchester encoding, FM0 encoding, FM1 encoding, etc. Thereafter, in the embodiment shown, the digitally encoded data is provided to the digital-to-analog converter 344 which converts the digitally encoded data into an analog signal. The RF front-end 346 modulates the analog signal to produce an RF signal at a particular carrier frequency that is transmitted via antenna 360 to one or more remote RFID devices 109 or 111. Antenna 360, when implemented as part of RF IC 50 or 70 can be an on-chip coil such as a near-field coil or other antenna.

The RF front-end 346 further includes transmit blocking capabilities such that the energy of the transmitted RF signal does not substantially interfere with the receiving of a back-scattered or other RF signal received from one or more remote RFID devices 109 or 111 via the antenna 360. Upon receiving an RF signal from one or more user remote RFID devices 109 or 111, the RF front-end 346 converts the received RF signal into a baseband signal. The digitization module 348, which may be a limiting module or an analog-to-digital converter, converts the received baseband signal into a digital signal. The predecoding module 350 converts the digital signal into an encoded signal in accordance with the particular RFID protocol being utilized. The encoded data is provided to the decoding module 352, which recaptures data, such as user data 102 therefrom in accordance with the particular encoding scheme of the selected RFID protocol. The protocol processing module 340 processes the recovered data to identify the object(s) associated with the user interface device(s) and/or provides the recovered data to the server and/or computer for further processing.

Millimeter wave transceiver 121 includes a power generating circuit 240, an oscillation module 244, a processing module 246, an oscillation calibration module 248, a comparator 250, an envelope detection module 252, an on-chip coil 262, a capacitor C1, and a transistor T1. The oscillation module 244, the processing module 246, the oscillation calibration module 248, can be implemented with separate components or in a shared baseband processing module, such a baseband processing module 190.

In operation, the power generating circuit 240 generates a supply voltage (VDD) from a radio frequency (RF) signal that is received via antenna 254. The power generating circuit 240 stores the supply voltage VDD in capacitor C1 and provides it to modules 244, 246, 248, 250, 252.

When the supply voltage VDD is present, the envelope detection module 252 determines an envelope of the RF signal, which includes a DC component corresponding to the supply voltage VDD. In one embodiment, the RF signal is an amplitude modulation signal, where the envelope of the RF signal includes transmitted data. The envelope detection module 252 provides an envelope signal to the comparator 250. The comparator 250 compares the envelope signal with a threshold to produce an inbound symbol stream.

The oscillation module 244, which may be a ring oscillator, crystal oscillator, or timing circuit, generates one or more clock signals that have a rate corresponding to the rate of the RF signal in accordance with an oscillation feedback signal. For instance, if the RF signal is a 60 GHz signal, the rate of the clock signals will be n*60 GHz, where "n" is equal to or greater than 1.

The oscillation calibration module 248 produces the oscillation feedback signal from a clock signal of the one or more clock signals and the stream of recovered data. In general, the oscillation calibration module 248 compares the rate of the clock signal with the rate of the stream of recovered data. Based on this comparison, the oscillation calibration module 248 generates the oscillation feedback to indicate to the oscillation module 244 to maintain the current rate, speed up the current rate, or slow down the current rate.

The processing module 246 receives the stream of recovered data and a clock signal of the one or more clock signals. The processing module 246 interprets the stream of recovered symbols to determine data, command or commands contained therein. The command may be to store data, update data, reply with stored data, verify command compliance, read user data, an acknowledgement, etc. If the command(s) requires a response, the processing module 246 provides a signal to the transistor T1 at a rate corresponding to the RF signal. The signal toggles transistor T1 on and off to generate an RF response signal that is transmitted via the antenna. In one embodiment, the millimeter wave transceiver 121 utilizes a back-scattering RF communication to send data that includes user data such as user data 102 or 103.

The millimeter wave transceiver 121 may further include a current reference (not shown) that provides one or more reference, or bias currents to the oscillation module 244, the oscillation calibration module 248, the envelope detection module 252, and the comparator 250. The bias current may be adjusted to provide a desired level of biasing for each of the modules 244, 248, 250, and 252.

Figure 12:
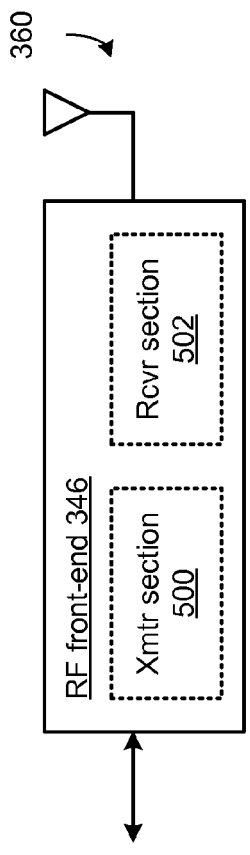
FIG. 12 is a schematic block diagram of an embodiment of RF front-end 346 in accordance with an embodiment of the present invention.

FIG. 12 is a schematic block diagram of an embodiment of RF front-end 346 in accordance with an embodiment of the present invention. In particular, RF receiver front end 346 of millimeter wave transceiver 29 operates as a radio frequency identification (RFID) reader. Transmitter section 500 transmits a transmit signal via antenna 360 to send data and/or power to one or more remote RFID devices 109 or 111. In turn the antenna 360 receives a received signal based on a backscattering of the transmit signal by a remote RFID device. As discussed in conjunction with FIG. 11, the RF front-end 346 further includes transmit blocking capabilities such that the energy of the transmitted RF signal does not substantially interfere with the receiving of a back-scattered or other RF signal received from one or more remote RFID devices via the antenna 360. In particular, receiver section 502 includes an interference blocking/cancellation circuitry as will be discussed in conjunction with FIGS. 13-14 that follow.

Figure 13:
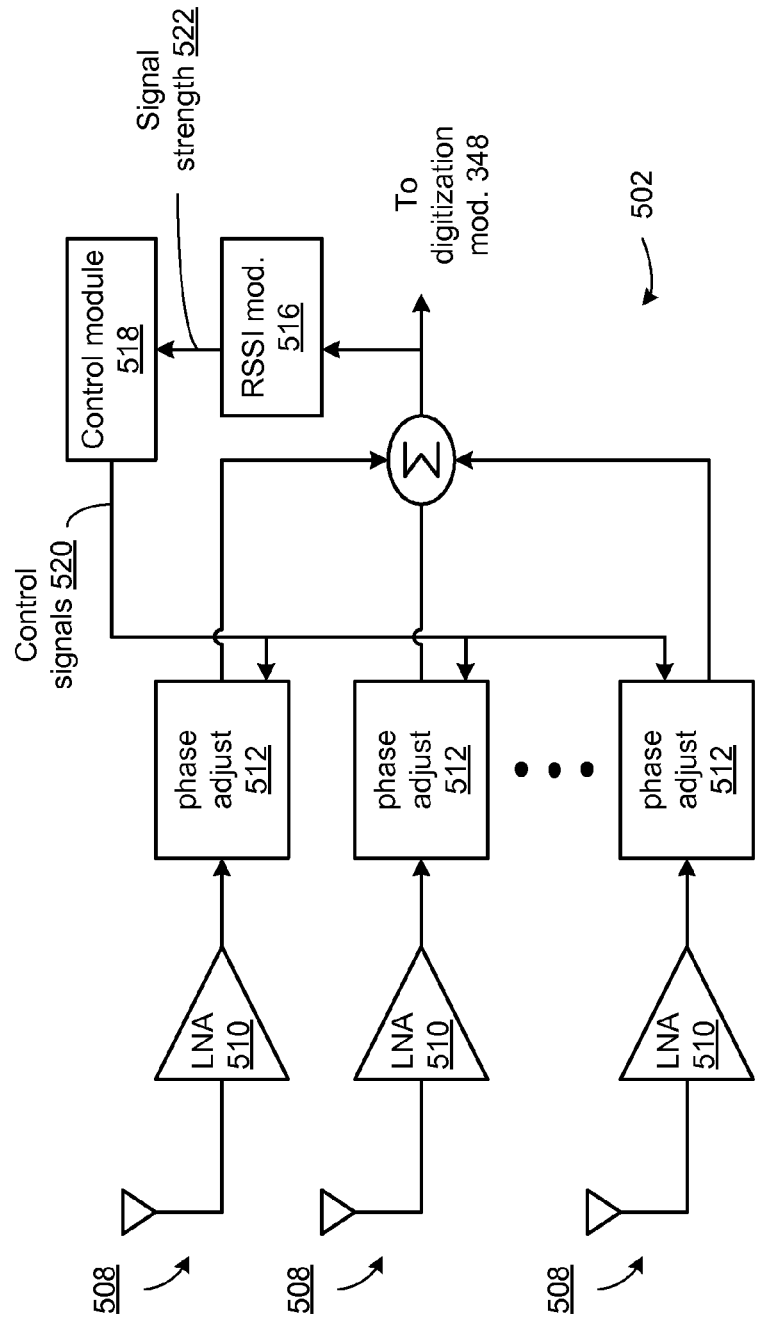
FIG. 13 is a schematic block diagram of an embodiment of receiver section 502 in accordance with an embodiment of the present invention.

FIG. 13 is a schematic block diagram of an embodiment of receiver section 502 in accordance with an embodiment of the present invention. In particular receiver section 502 includes an antenna module that includes a plurality of antennas 508. The antennas 508 are coupled to generate a plurality of millimeter wave RFID signals from RF signals received by each antenna based on a backscattering of a transmit signal by a remote RFID device. A plurality of a phase adjusters 510 generate a plurality of phase adjusted signals from the plurality of millimeter wave RFID signals, under the control of the control signals 520. A combining module, such as the summing circuit shown combines the plurality of phase adjusted signals to generate a received signal that is passed to digitization module 348 and to RSSI module 516. While a summing circuit is shown, other combining circuit that operate to add or subtract the phase adjusted signals can likewise be employed.

Signal strength module, such as RSSI module 516 generates signal strength 522. In particular, RSSI module detects the received signal strength via an envelope detector, peak detector, or other amplitude detector, energy detector, power detector, that is implemented via an analog circuit or via digital sampling to generate a signal strength 522 such as a received signal strength indicator of the received signal. Control module operates in a closed-loop fashion to generates the control signals 520 to reduce the signal strength 522. By reducing the signal strength of the received signal, the control module 518 can partially cancel the transmit signal or other blocking signals in order to increase the receiver sensitivity.

For instance, in an embodiment of the present invention, the transmit signal is a mono-frequency carrier wave of high amplitude. Regardless of the other isolation employed, a portion of the transmit signal may be received by receiver section 502 that is greater in signal strength than the backscattered signal received from the remote RFID device or devices. Control module 518 serves to control the phase adjustors 512 to attenuate the carrier wave, while passing (or attenuating less) the amplitude modulated sidebands produced by the backscattering of the transmit signal. This increases the signal to noise ratio of the received signal and/or increases the sensitivity of receiver section 502.

More generally, the millimeter wave signal received by receiver section 502 includes a desired signal component that originates from a remote RFID device and a blocking signal component or other undesired signal component from other sources of noise and/or interference. Control module 518 serves to control the phase adjustors 512 to attenuate the undesired signal component, while passing, attenuating (less than the undesired signal component) or actually boosting the desired signal component. This increases the signal to noise ratio of the received signal and/or increases the sensitivity of receiver section 502.

In an embodiment of the present invention, control module 518 can include can include a processing device such as a shared processing device, individual processing device, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the control module 518 via logic, circuitry, or software to implement a search routine, optimization routine or other control function to select the control signals 520 to reduce the signal strength 522 below a signal strength threshold.

Figure 14:
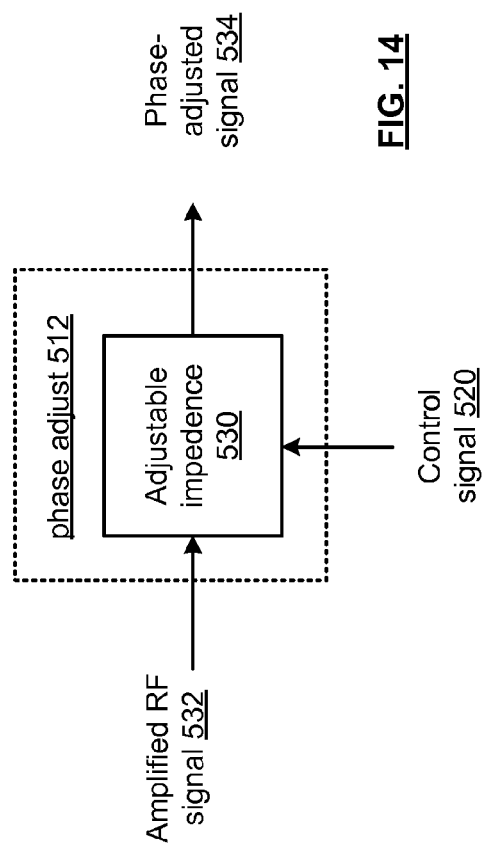
FIG. 14 is a schematic block diagram of an embodiment of phase adjust 512 in accordance with an embodiment of the present invention.

FIG. 14 is a schematic block diagram of an embodiment of phase adjuster 512 in accordance with an embodiment of the present invention; Adjustable impedance 530 includes a reactive element such as an inductor or capacitor that is adjustable in response to the phase control signal 520 and that alters the phase of the amplified RF signal 532 from a low noise amplifier 510 to produce the phase adjusted signal 534. Control signal 520 can be an analog signal that varies an impedance of adjustable impedance 530 in a continuous fashion or can be a discrete time or digital signal. In either instance, control signal 520 controls the adjustable impedance 530 to produce a phase adjusted signal 534.

Figure 15:
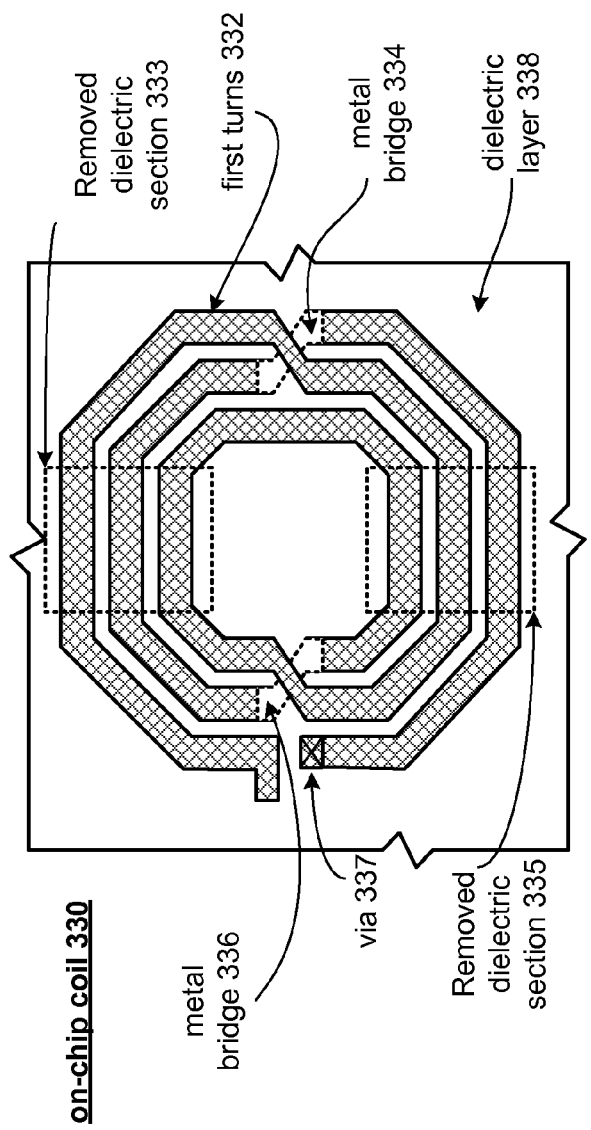
FIG. 15 is a top view of a coil 330 in accordance with an embodiment of the present invention.

FIG. 15 is a top view of a coil 330 in accordance with the present invention. As shown, the first turns 332 includes metal bridges 334 and 336 to couple various sections of the winding together. In particular a top view of coil 330, such as coil 360 and/or coil 262 is shown as included in a portion of RF IC 50 or 70 to implement a near field coil or other antenna structure, such all or a portion of antennas 360, 262, 508, etc. The first turn is on dielectric layer 338, while the metal bridges 334 and 336 are on a lower dielectric layer, which enables the first turns to maintain their symmetry. Optional removed dielectric sections 333 and 335 are shown that provides greater magnetic coupling to the second turns that are below. The removed dielectric sections 333 and 335 can be removed using a microelectromechanical systems (MEMS) technology such as dry etching, wet etching, electro discharge machining, or using other integrated circuit fabrication techniques. The remaining elements of the coil 330 can be created by etching, depositing, and/or any other method for fabricating components on an integrated circuit.

Figure 16:
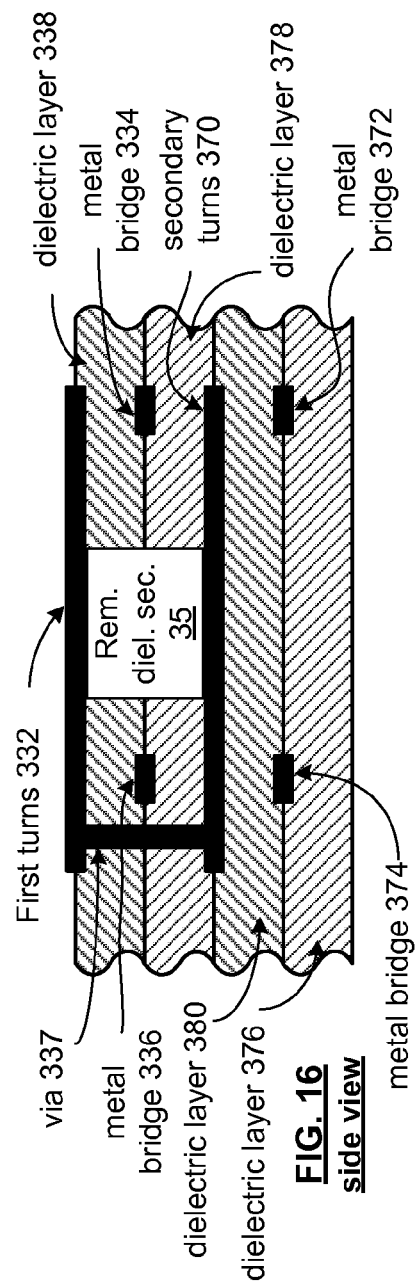
FIG. 16 is a side view of a coil 330 in accordance with an embodiment of the present invention.

FIG. 16 is a side view of a coil 330 in accordance with the present invention. As shown, dielectric layer 338 supports the first turns 332. A lower layer, dielectric layer 348, supports metal bridges 334 and 336. Utilizing conventional integrated circuit technologies, the metal bridges 334 and 336 are coupled to the corresponding portions of the first turns 332. As further shown, dielectric layer 380 supports the second turns 370 while dielectric layer 376 supports the metal bridges 372 and 374. The first turns 332 and the second turns 370 are coupled together by via 337. As discussed above, removed dielectric section 335 removes portions of both dielectric layers 338 and 348 to improve the magnetic coupling between the first turns 332 and second turns 370.

Figure 17:
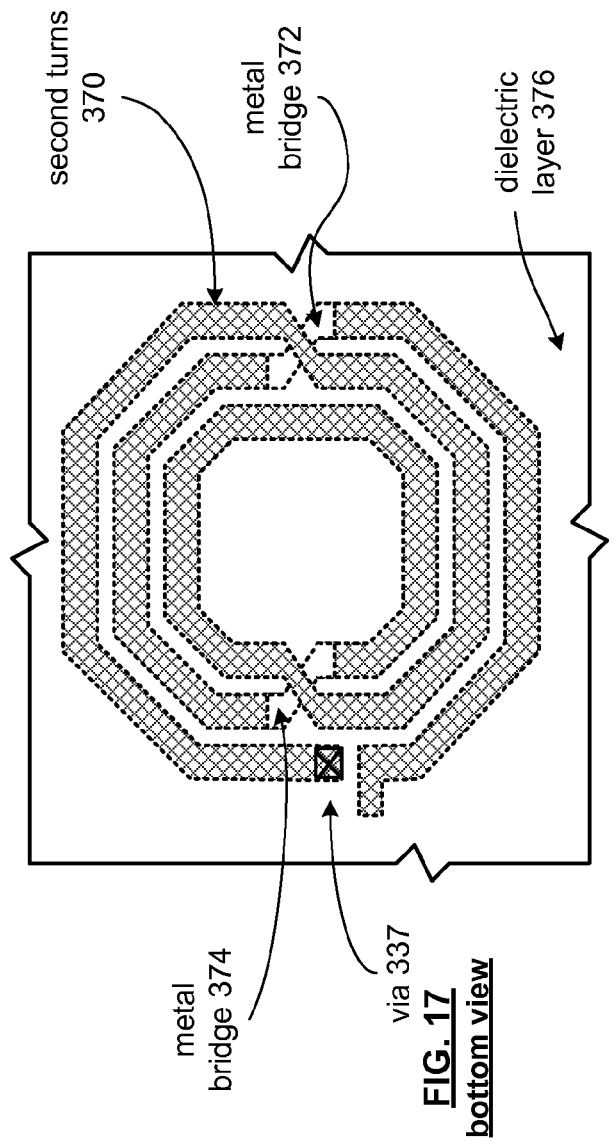
FIG. 17 is a bottom view of a coil 330 in accordance with an embodiment of the present invention.

FIG. 17 is a bottom view of a coil 330 in accordance with the present invention. As shown, the second turn 370 on dielectric layer 376 and the metal bridges 372 and 374 couple the winding of the second turns together. The second turns have a symmetrical pattern and is similar to the winding of the first turns 332. As one of average skill in the art will appreciate, the first and second turns may include more or less turns, and additional turns may also be disposed on additional dielectric layers.

It should be noted that while FIGS. 15-17 present a particular configuration of an on-chip coil, other on-chip coil configurations can likewise be employed with the broad scope of the present invention.

Figure 18:
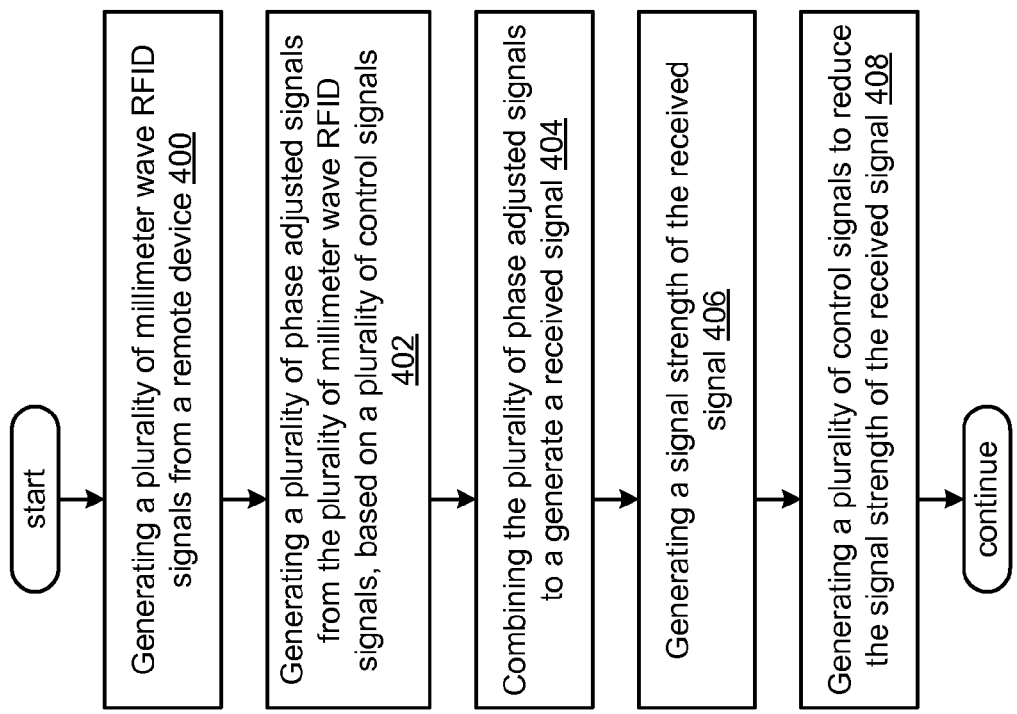
FIG. 18 is a flow chart of an embodiment of a method in accordance with the present invention.

FIG. 18 is a flowchart representation of a method in accordance with an embodiment of the present invention. In particular a method is presented for use in conjunction with one or more features and functions described in conjunction with FIGS. 1-14. In step 400, a plurality of phase adjusted signals are generated from the plurality of millimeter wave RFID signals, based on a plurality of control signals. In step 402, the plurality of phase adjusted signals are combined to generate a received signal. In step 404, a signal strength of the received signal is generated. In step 406, the plurality of control signals are generated to reduce the signal strength of the received signal.

In an embodiment of the present invention, the plurality of millimeter wave RFID signals are received based on a back-scattering of a transmit signal by the remote RFID device and the signal strength of the received signal is reduced to partially cancel the transmit signal. The plurality of phase adjusted signals can be generated by controlling an adjustable impedance, based on the plurality of control signals. The plurality of millimeter wave RFID signals and the transmit signal can be within a 54-67 GHz frequency band.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An radio frequency identification (RFID) receiver front end comprising:
   an antenna module coupled to generate a plurality of millimeter wave RFID signals from a millimeter wave signal received from a remote RFID device that includes a desired signal component and a blocking signal component;
   a plurality of a phase adjusters, coupled to the antenna module, that generate a plurality of phase adjusted signals from the plurality of millimeter wave RFID signals, based on a plurality of control signals;
   a combining module, coupled to the plurality of phase adjusters, that combines the plurality of phase adjusted signals to generate a received signal;
   a signal strength module, coupled to the combining module, that generates a signal strength of the received signal; and
   a control module, coupled to the signal strength module and the plurality of phase adjusters, that generates the plurality of control signals to reduce the signal strength of the received signal to partially cancel the blocking signal component.

2. The RFID receiver front end of claim 1 wherein each of the plurality of a phase adjusters includes an adjustable impedance.

3. The RFID receiver front end of claim 2 wherein the adjustable impedance includes at least one of an adjustable capacitance; and an adjustable inductance.

4. The RFID receiver front end of claim 2 wherein the control module generates the plurality of control signals to control the adjustable impedance of each of the plurality of a phase adjusters.

5. The RFID receiver front end of claim 1 wherein the combining module includes a summing circuit.

6. The RFID receiver front end of claim 1 wherein the antenna module includes a plurality of antennas that corresponds to the plurality of millimeter wave RFID signals.

7. The RFID receiver front end of claim 1 wherein the blocking signal component includes a transmit signal from a transmitter collocated with the RFID receiver front end.

8. An radio frequency identification (RFID) receiver front end comprising:
   an antenna module coupled to generate a plurality of millimeter wave RFID signals from a millimeter wave signal received from a remote RFID device;
   a plurality of a phase adjusters, coupled to the antenna module, that generate a plurality of phase adjusted signals from the plurality of millimeter wave RFID signals, based on a plurality of control signals;
   a combining module, coupled to the plurality of phase adjusters, that combines the plurality of phase adjusted signals to generate a received signal;
   a signal strength module, coupled to the combining module, that generates a signal strength of the received signal; and
   a control module, coupled to the signal strength module and the plurality of phase adjusters, that generates the plurality of control signals to reduce the signal strength of the received signal.

9. The RFID receiver front end of claim 8 wherein the plurality of millimeter wave RFID signals are received based on a backscattering of a transmit signal by the remote RFID device and wherein the control module reduces the signal strength of the received signal to partially cancel the transmit signal.

10. The RFID receiver front end of claim 8 wherein the antenna module generates the plurality of millimeter wave RFID signals from a millimeter wave signal received from the remote RFID device that includes a desired signal component and a blocking signal component; and
   wherein the control module reduces the signal strength of the received signal to partially cancel the blocking signal component.

11. The RFID receiver front end of claim 8 wherein each of the plurality of a phase adjusters includes an adjustable impedance.

12. The RFID receiver front end of claim 11 wherein the adjustable impedance includes at least one of an adjustable capacitance; and an adjustable inductance.

13. The RFID receiver front end of claim 11 wherein the control module generates the plurality of control signals to control the adjustable impedance of each of the plurality of a phase adjusters.

14. The RFID receiver front end of claim 8 wherein the combining module includes a summing circuit.

15. The RFID receiver front end of claim 8 wherein the antenna module includes a plurality of antennas that corresponds to the plurality of millimeter wave RFID signals.

16. A method for use in radio frequency identification (RFID) receiver front end, the method comprising:
- generating a plurality of millimeter wave RFID signals from a millimeter wave signal received from a remote RFID device;
- generating a plurality of phase adjusted signals from the plurality of millimeter wave RFID signals, based on a plurality of control signals;
- combining the plurality of phase adjusted signals to generate a received signal;
- generating a signal strength of the received signal; and
- generating the plurality of control signals to reduce the signal strength of the received signal.

17. The method of claim 16 wherein the plurality of millimeter wave RFID signals are generated based on a backscattering of a transmit signal received from the remote RFID device and the signal strength of the received signal is reduced to partially cancel the transmit signal.

18. The method of claim 16 wherein the plurality of millimeter wave RFID signals are generated from a millimeter wave signal received from the remote RFID device that includes a desired signal component and a blocking signal component; and
- wherein the control signals are generated to reduce the signal strength of the received signal to partially cancel the blocking signal component.

19. The method of claim 16 wherein plurality of phase adjusted signals are generated by controlling an adjustable impedance, based on the plurality of control signals.

20. The method of claim 16 wherein the plurality of millimeter wave RFID signals and the transmit signal are within a 54-67 GHz frequency band.

* * * * *

UNITED STATES PATENT AND TRADEMARK OFFICE
CERTIFICATE OF CORRECTION

| | |
|---|---|
| PATENT NO. | : 8,311,506 B2 |
| APPLICATION NO. | : 12/393443 |
| DATED | : November 13, 2012 |
| INVENTOR(S) | : Rofougaran |

It is certified that error appears in the above-identified patent and that said Letters Patent is hereby corrected as shown below:

In the Claims
Col. 16, line 5, in claim 2: after "plurality of" delete "a"
Col. 16, line 13, in claim 4: after "plurality of" delete "a"
Col. 16, line 23, in claim 8: replace "An radio" with --A radio--
Col. 16, line 57, in claim 11: after "plurality of" delete "a"
Col. 16, line 64, in claim 13: after "plurality of" delete "a"
Col. 18, line 12, in claim 19: after "claim 16 wherein" insert --the--

Signed and Sealed this
First Day of October, 2013

Teresa Stanek Rea
*Deputy Director of the United States Patent and Trademark Office*